United States Patent
Bergeal et al.

(10) Patent No.: US 7,998,424 B2
(45) Date of Patent: Aug. 16, 2011

(54) EXHAUST SYSTEM COMPRISING ZONED OXIDATION CATALYST

(75) Inventors: David Bergeal, Ware (GB); Paul Richard Phillips, Royston (GB); Martyn Vincent Twigg, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 512 days.

(21) Appl. No.: 12/160,068

(22) PCT Filed: Jan. 3, 2007

(86) PCT No.: PCT/GB2007/050003
§ 371 (c)(1), (2), (4) Date: Oct. 28, 2008

(87) PCT Pub. No.: WO2007/077462
PCT Pub. Date: Jul. 12, 2007

(65) Prior Publication Data
US 2009/0217652 A1 Sep. 3, 2009

(30) Foreign Application Priority Data
Jan. 6, 2006 (GB) .................................. 0600130.9

(51) Int. Cl.
*B01D 53/94* (2006.01)
*F01N 3/28* (2006.01)
(52) U.S. Cl. ........................................ 422/180; 422/222
(58) Field of Classification Search .................. 422/171, 422/177, 180, 222
See application file for complete search history.

(56) References Cited

U.S. PATENT DOCUMENTS

| 5,281,128 A | 1/1994 | Dalla Betta et al. |
| 6,375,910 B1 * | 4/2002 | Deeba et al. ............... 423/239.1 |
| 6,827,909 B1 | 12/2004 | Brück et al. |
| 7,524,465 B2 * | 4/2009 | Kumar et al. ................. 422/180 |
| 7,837,953 B2 * | 11/2010 | Shore ............................ 422/626 |
| 2001/0026838 A1 * | 10/2001 | Dettling et al. ............... 427/230 |
| 2008/0047244 A1 * | 2/2008 | Zhang et al. .................... 55/524 |

FOREIGN PATENT DOCUMENTS

| EP | 0 470 653 A1 | 2/1992 |
| EP | 0 737 505 A1 | 10/1996 |
| EP | 1 561 509 A1 | 8/2005 |
| GB | 2 406 803 A | 4/2005 |
| WO | WO-99/47260 A1 | 9/1999 |
| WO | WO-99/55459 A1 | 11/1999 |
| WO | WO-01/74476 A1 | 10/2001 |

* cited by examiner

*Primary Examiner* — Jill Warden
*Assistant Examiner* — Joye L Woodard
(74) *Attorney, Agent, or Firm* — RatnerPrestia

(57) ABSTRACT

An exhaust system for a lean-burn internal combustion engine comprises a catalyst for oxidising carbon monoxide and hydrocarbons comprising a flow-through substrate monolith comprising a first platinum group metal (PGM) zone containing at least one PGM supported on a surface area-increasing washcoat component, a second PGM zone containing at least one PGM supported on a surface area-increasing washcoat component, a third PGM zone containing at least one PGM supported on a surface area-increasing washcoat component wherein both the PGM loading in the first PGM zone and the PGM loading in the third PGM zone is greater than the PGM loading in the second PGM zone and wherein the first PGM zone comprises a washcoat loading that is less than a washcoat loading of the third PGM zone.

20 Claims, 3 Drawing Sheets

EXHAUST SYSTEM COMPRISING ZONED OXIDATION CATALYST

CROSS-REFERENCE TO RELATED APPLICATIONS

This application is the U.S. National Phase application of PCT International Application No. PCT/GB2007/050003, filed Jan. 3, 2007, and claims priority of British Patent Application No. 0600130.9, filed Jan. 6, 2006, all of which are incorporated herein by reference.

FIELD OF THE INVENTION

The present invention relates to an exhaust system for a lean-burn internal combustion engine, suitably a light-duty diesel engine, comprising a catalyst for oxidising carbon monoxide (CO) and hydrocarbons (HC), such as a soluble organic fraction (SOF) of particulate matter in a diesel exhaust gas.

BACKGROUND OF THE INVENTION

U.S. Pat. No. 6,827,909 B1 (the entire contents of which is incorporated herein by reference) discloses a catalytic converter for cleaning exhaust gas from a diesel engine including at least one honeycomb body coated with catalytically active material and having passages through which the exhaust gas can flow, walls separating the passages from each other, and first and second zones disposed in succession in a flow direction. The first zone has a lower thermal capacity per unit volume of the honeycomb body than the second zone. In one embodiment the first zone and the second zone are formed by coatings having different thicknesses. The first zone can rapidly reach its operating temperature at high exhaust gas temperatures while the second zone stores heat for operating conditions involving a low exhaust gas temperature.

WO 01/74476 (the entire contents of which is incorporated herein by reference) discloses a multi-zoned $NO_x$ absorber comprising a first zone, a second zone and, optionally, one or more intermediate zones disposed between the first and second zone. In the first zone, a catalytic trap material comprises a refractory metal oxide support having dispersed thereon a palladium catalytic component in the amount of about 30 to about 300 $g/ft^{-3}$, a platinum catalytic component in the amount of 0 to about 100 $g/ft^{-3}$ and a rhodium catalytic component in the amount of 0 to about 10 $g/ft^{-3}$; and a $NO_x$ sorbent comprising one or more basic oxygenated compounds of one or more alkaline earth metals and optionally, one or more basic oxygenated compounds of one or more alkali metals. In the second zone, the catalytic trap material comprises a refractory metal oxide support having dispersed thereon a palladium catalytic component in the amount of 0 to about 50 $g/ft^{-3}$, a platinum catalytic component in the amount of about 10 to about 100 $g/ft^{-3}$ and a rhodium catalytic component in the amount of about 5 to about 20 $g/ft^{-3}$; and a $NO_x$ sorbent comprising one or more basic oxygenated compounds of one or more metals selected from the group consisting of alkali metals and alkaline earth metals. In the optional zone(s), the catalytic trap material comprises a refractory metal oxide support having dispersed thereon a palladium catalytic component in the amount of about 25 to about 75 $g/ft^{-3}$, a platinum catalytic component in the amount of about 5 to about 30 $g/ft^{-3}$ and a rhodium catalytic component in the amount of 0 to about 10 $g/ft^{-3}$; and a $NO_x$ sorbent comprising one or more basic oxygenated compounds of one or more metals selected from the group consisting of alkali metals and alkaline earth metals. Therefore, the disclosure suggests that the first zone, followed by an intermediate zone followed finally by the second zone can have a maximum total platinum group metal loading of 410, 115 and 170 $gft^{-3}$ respectively.

The New European Driving Cycle (NEDC) is used for emission certification of light-duty diesel vehicles in Europe. The NEDC consists of four ECE segments, repeated without interruption, followed by one European Urban Driving Cycle (EUDC) segment. There is no idling period before commencing the first ECE segment. The ECE cycle is an urban driving cycle, also known as UDC, and is designed to represent city driving conditions, e.g. in Paris or Rome. It is characterised by low vehicle speed, low engine load and low exhaust gas temperature. The EUDC segment accounts for more aggressive driving and high speed driving modes. The NEDC is also known as the MVEG-A cycle. The equivalent test cycle to the NEDC in the United States is the FTP-75, which has been supplemented with the US06 segment to reflect aggressive, high speed driving and the SC03 segment, to test for emission standard compliance during operation of air-conditioning. Other countries have adopted their own equivalent test cycles.

Catalysts for oxidising at least carbon monoxide (CO) and hydrocarbons (HC) in exhaust gas emitted from lean-burn engines typically comprise one or more expensive platinum group metal(s) (PGMs), such as platinum, palladium and/or rhodium. A catalyst manufacturer would have a competitive advantage if it could develop a new oxidation catalyst that achieves a better conversion of CO and HC over an entire legislated emission test cycle without increasing the total amount of PGMs, or even using less PGMs, in the new oxidation catalyst relative to a standard oxidation catalyst. For the purposes of this disclosure, a "standard" oxidation catalyst has a uniform washcoat loading and a uniform PGM loading along its entire length.

SUMMARY OF THE INVENTION

In seeking to develop new oxidation catalysts we have found that, in some vehicles, by disposing a relatively high loading of platinum in a zone at an inlet end of a catalyst substrate, the conversion of CO and HC during acceleration phases of the ECE cycle was improved because the arrangement promoted a more rapid light-off of the catalyst. However, during cooler phases of the ECE cycle, such as during decelerations, we found that this front of the catalyst "lit-out".

For the purposes of this disclosure, "light-off" is defined as the temperature at, and above which, a catalyst catalyses the conversion of a reactant at $\geq 50\%$ efficiency or T50. "Lit-out" means that the catalyst temperature has fallen below the level at which the catalyst catalyses the conversion of a reactant at $\geq 50\%$ efficiency. It is also possible to select alternative measures for determining light off such as T70, i.e. the temperature at, and above which, a catalyst catalyses the conversion of a reactant at $\geq 70\%$ efficiency, but for the purposes of this specification "light off" shall mean T50.

We have now developed an oxidation catalyst for lean-burn engines that achieves better conversion of CO and HC over legislated emission test cycles than standard oxidation catalysts without using more PGMs, and indeed can use less PGMs, than standard oxidation catalysts.

According to one aspect, the invention provides an exhaust system for a lean-burn internal combustion engine, comprising a catalyst for oxidising carbon monoxide (CO) and hydrocarbons (HC), which catalyst comprising a flow-through substrate monolith comprising a first platinum group metal zone of substantially uniform length containing at least one platinum group metal (PGM) supported on a surface area-increasing washcoat component, which first platinum group metal zone being defined at an upstream end by an inlet end of the substrate monolith and at a downstream end by a point less than half way along a length of the substrate monolith measured from the inlet end, a second platinum group metal zone containing at least one PGM supported on a surface area-increasing washcoat component, which second platinum group metal zone being of substantially uniform length and comprising the point half way along the substrate monolith length measured from the inlet end and a third platinum group metal zone containing at least one PGM supported on a surface area-increasing washcoat component of substantially uniform length, which third platinum group metal zone being defined at a downstream end by an outlet end of the substrate monolith and at an upstream end by a point at most three quarters of the way along the substrate monolith length measured from the inlet end, wherein both the PGM loading in the first platinum group metal zone and the PGM loading in the third zone is greater than the PGM loading in the second zone and wherein the first platinum group metal zone comprises a washcoat loading that is less than a washcoat loading of the third platinum group metal zone.

The substrate monolith may comprise a first washcoat zone, a second washcoat zone, and/or a third washcoat zone comprising the surface area-increasing washcoat components of the first, second, and third platinum group metal zones.

It is contemplated that the platinum group metal zones do not have to be commensurate with each of the washcoat zones, i.e., there may be a three zone platinum group metal and a two zone washcoat that do not correspond. Additionally, the first, second, and third platinum group metal zones may be equivalent to first, second, and third washcoat zones.

BRIEF DESCRIPTION OF THE DRAWINGS

In order that the invention may be more fully understood, an embodiment and Examples are provided by way of illustration only and with reference to the accompanying drawings, in which.

DETAILED DESCRIPTION OF THE INVENTION

Figure 1:
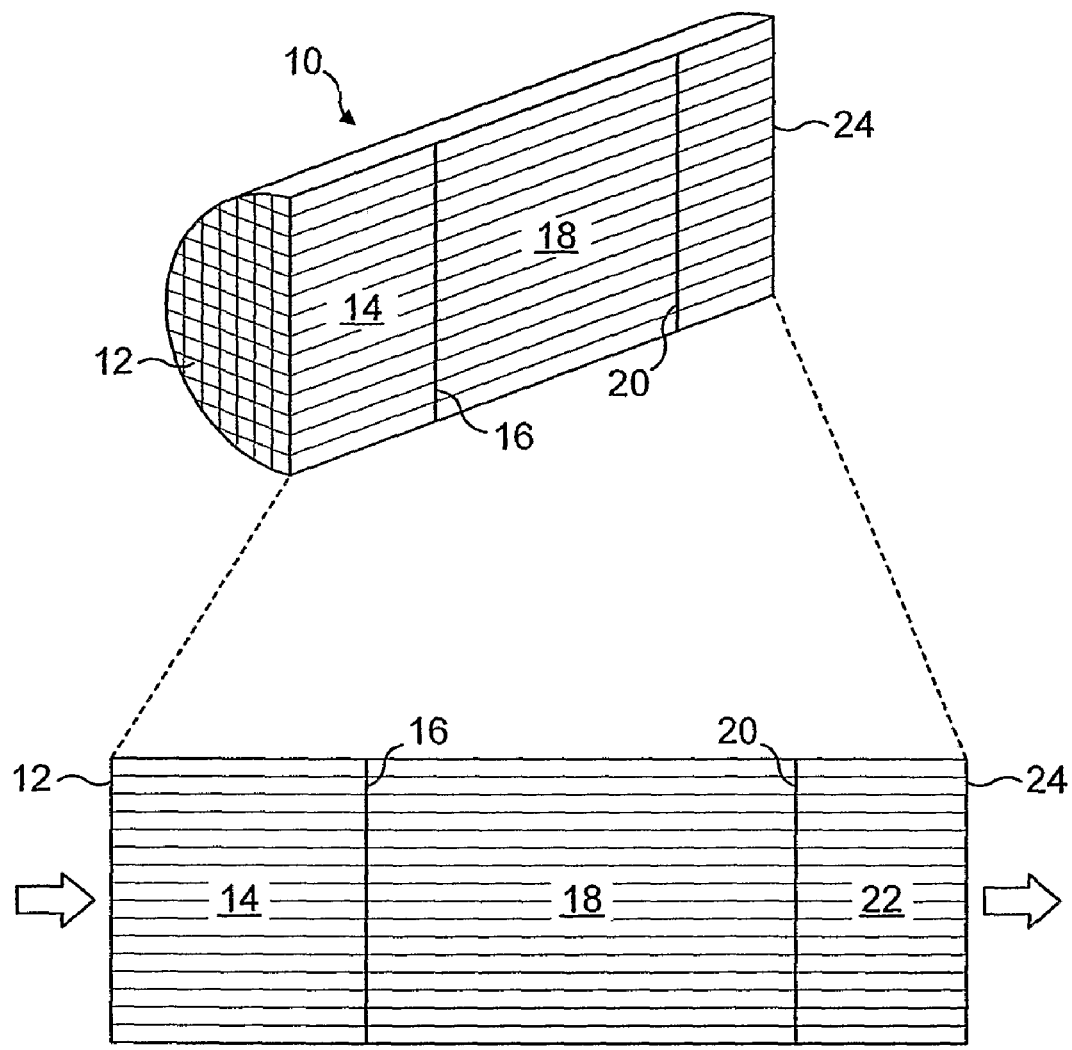
FIG. 1 is a schematic drawing showing a section through a substrate monolith comprising an embodiment of an oxidation catalyst for use in the present invention.

Without wishing to be bound by theory, we believe that the invention is able to achieve better CO and HC conversion over the NEDC test cycle than a standard oxidation catalyst or even a two-zone oxidation catalyst consisting of a zone of higher PGM loading at the inlet end, because the third platinum group metal zone maintains light-off during cool-down phases of the cycle, whereas the standard or 2-zone oxidation catalyst will "light-out". The second platinum group metal zone can act as a heat buffer and provide for HC and CO conversion under high speed conditions in the EUDC part of the NEDC cycle. Furthermore, in embodiments wherein the second washcoat zone comprises appropriate washcoat components such as zeolites, the second washcoat zone can provide for HC storage during lower temperature phases of the cycle for subsequent release and conversion during higher temperature phases.

In a particular embodiment, the catalyst is substantially free of alkaline earth metals and alkali metals, i.e. the catalyst is not intended for use as a $NO_x$ adsorber (such as is disclosed in WO 01/74476) in an exhaust system wherein an exhaust gas is intermittently enriched to desorb adsorbed $NO_x$ and convert it to $N_2$ using a suitable reductant, e.g. by modulating the air-to-fuel ratio in the engine, post-injecting or after-injecting fuel into an engine cylinder before an exhaust valve is opened or by injecting reductant directly into an exhaust gas downstream of an exhaust manifold. In another embodiment, the catalyst is substantially free of lanthanide metals such as cerium.

In one embodiment, the downstream end of the first washcoat zone is 15-70% along the substrate monolith length from the inlet end, wherein the second washcoat zone comprises 10-80% of the total substrate monolith length. In another embodiment, the downstream end of the first washcoat zone is 10-65% along the substrate monolith length from the inlet end, wherein the second washcoat zone comprises 10-80% of the total substrate monolith length.

In another embodiment, the upstream end of the third washcoat zone is 70-15% along the substrate monolith length from the inlet end, wherein the second washcoat zone comprises 10-80% of the total substrate monolith length. In another embodiment, the upstream end of the third washcoat zone is 65-10% along the substrate monolith length from the inlet end, wherein the second washcoat zone comprises 10-80% of the total substrate monolith length.

In one embodiment, the total PGM loading in the first platinum group metal zone is from 10 $gft^{-3}$ to 240 $gft^{-3}$; whereas in another embodiment, the total PGM loading in the first platinum group metal zone is from 30 $gft^{-3}$ to 240 $gft^{-3}$.

In another embodiment, the total PGM loading in the third platinum group metal zone is from 10 $gft^{-3}$ to 120 $gft^{-3}$, but in a particular embodiment, the PGM loading in the first platinum group metal zone is the same as the PGM loading in the third platinum group metal zone. In another embodiment, the total PGM loading in the third platinum group metal zone is from 60 $gft^{-3}$ to 120 $gft^{-3}$.

The total PGM loading in the second platinum group metal zone can be from 5 $gft^{-3}$ to 30 $gft^{-3}$.

The total PGM loading on the substrate monolith as a whole can be from 25 $gft^{-3}$ to 390 $gft^{-3}$, such as from 30 $gft^{-3}$ to 240 $gft^{-3}$ or 50 $gft^{-3}$ to 120 $gft^{-3}$. "PGM" herein includes platinum, palladium, rhodium and iridium. In the exemplified embodiments herein, the PGM in the first, second and third platinum group metal zones consists of platinum.

Typically, the surface area-increasing washcoat component is an oxide selected from the group consisting of zeolites, alumina, titania, silica, ceria, zirconia and mixtures and mixed and composite oxides containing any two or more thereof. In a particular embodiment, the first washcoat zone comprises a washcoat that has a lower thermal capacity than the washcoat of either the second or third washcoat zones.

In this regard, the washcoat loading in the first washcoat zone can be from 0.5 $gin^{-3}$ to 2.5 $gin^{-3}$; and the washcoat loading in the third washcoat zone can be from 1.5 $gin^{-3}$ to 5.0 $gin^{-3}$. In one embodiment, the washcoat loading of the second washcoat zone is the same as the washcoat loading in the third washcoat zone.

In a particular embodiment, the washcoat loading in the third washcoat zone is at least 10% greater, e.g. at least 15% or at least 20% greater than the washcoat loading in either the first or second washcoat zones. Alternatively, the washcoat loading in the second and third washcoat zones is at least 10% greater, e.g. at least 15% or at least 20% greater than the washcoat loading in the first washcoat zone.

Of course, it is also possible, in a first step, to coat the substrate monolith with a first washcoat zone and a second washcoat zone contiguous with the first washcoat zone, wherein the first washcoat zone has a lower thermal capacity than the second washcoat zone, and then to superimpose on the coated substrate monolith the PGM-containing zones. That is, two of the PGM zones do not have to be defined by the washcoat zones, e.g. the second washcoat zone can begin part way along the second PGM zone.

An advantage of this arrangement is that the higher thermal capacity washcoat in the third washcoat zone or the second and third washcoat zones provides longer retention of heat during cool-down phases of the NEDC, i.e. the oxidation catalyst remains lit-off for as long as possible by retaining thermal energy in a higher thermal mass in a rear section of the substrate monolith; whereas the lower front washcoat loading provides faster light-off during heat-up phases of the test. By combining the concepts of locating the PGM in at least three zones along the length of the substrate monolith; and increasing the thermal mass in the second and third washcoat zones, or in the third washcoat zone only, the overall CO and HC conversion in the NEDC can be improved yet further.

One way of obtaining the higher thermal capacity in the downstream washcoat zones is to use thicker washcoat, as is described in U.S. Pat. No. 6,827,909 B1. However, the thicker washcoat can increase backpressure in the system beyond desirable design tolerances and can even lead to blockages forming in the flow-through monolith substrates during manufacture, particularly on higher cell density monoliths. In a particular embodiment, however, we use a washcoat component which has an inherently higher thermal capacity, thus reducing or avoiding the problems associated with thicker washcoats. Illustrative examples of higher thermal capacity washcoat components include densified alpha alumina, densified zirconia, densified lanthana and densified ceria.

Common properties amongst such materials are low surface area, refractory nature and a glassy consistency. The materials are also known as "fused". Fused zirconia, for example, has a density of 5.90 gcm$^{-3}$; densified alpha alumina, 3.97 gcm$^{-3}$; densified lanthana, 6.5 gcm$^{-3}$; and densified ceria (cerium II oxide), 7.1 gcm$^{-3}$. Any material having a density of at least 3.5 gcm$^{-3}$ has application in this aspect of the invention.

The manufacture of oxidation catalysts according to the invention can be achieved using methods and apparatus known in the art including those disclosed in our WO 99/47260 incorporated herein by reference and no further details will be given herein.

According to another aspect, the invention provides an apparatus comprising a diesel engine such as a light-duty diesel engine and an exhaust system according to the invention. In this particular embodiment, the catalyst for oxidising CO and HC can be referred to as a diesel oxidation catalyst or DOC.

FIG. 1 shows, in aspect, a longitudinal section through a flow through substrate monolith 10 such as a conventional cordierite 400 cells per square inch (cpsi (62 cells cm$^{-2}$)) construction. Substrate monolith 10 is coated from an inlet end 12 (indicated also by the directional arrow in the plan view showing the direction of exhaust gas flow in substrate monolith) with a platinum supported on an alumina washcoat in a zone 14 defined at a downstream end 16. A second washcoat zone 18 is defined at its upstream end by the downstream end 16 of the first washcoat zone and at a downstream end by the upstream end 20 of a third washcoat zone 22. Second washcoat zone 18 includes platinum supported on an alumina washcoat at a lower platinum loading than in first washcoat zone 14. Third washcoat zone 22 is defined at its downstream end by outlet end 24 of the substrate monolith 10 and comprises platinum supported on an alumina washcoat at a similar platinum loading to the first washcoat zone. The first washcoat zone is 30% of the total length of the substrate monolith and the third washcoat zone is 20% of the total length of the substrate monolith. The washcoat loadings in the second and third platinum zones can be higher than the washcoat loading in the first platinum zone.

EXAMPLES

Example 1

Figure 2:
FIG. 2 is a trace showing cumulative CO emissions for a vehicle fitted with an exhaust system according to the invention run over the NEDC cycle compared with a standard exhaust system.

A 1.5 liter capacity TDI passenger vehicle complying with Euro III emission standards was fitted with a substrate monolith coated along its total length with a standard, homogenous oxidation catalyst washcoat supporting platinum. The vehicle was then tested over the NEDC test cycle. The same vehicle was then fitted with a substrate monolith comprising a three-zone Pt oxidation catalyst/two-zone washcoat loading oxidation catalyst according to the invention, wherein the total Pt loading was the same as for the standard oxidation catalyst, and the NEDC test was repeated. The cumulative carbon monoxide conversion results are shown in FIG. 2 (left-hand axis) superimposed on the speed map (right hand axis) of the NEDC test cycle. The upper CO trace shows engine-out CO, which were identical for both test runs. It can be clearly seen from the lower trace that the accumulated CO for the oxidation catalyst according to the invention achieves about 30% better CO conversion over the NEDC than the standard oxidation catalyst.

Example 2

Figure 3:
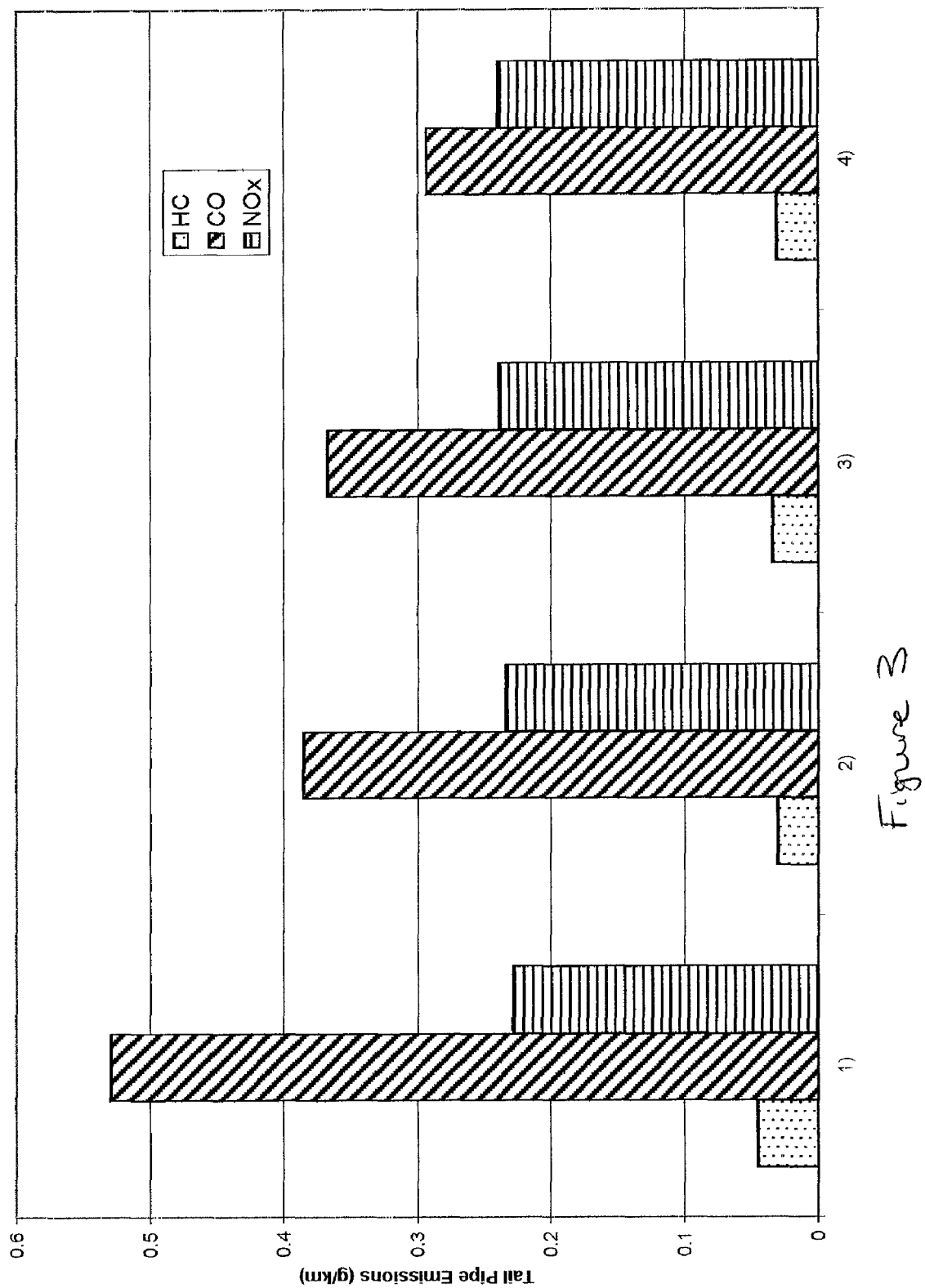
FIG. 3 is a bar chart showing the average tailpipe bag emissions comparing HC, CO and $NO_x$ emissions over the NEDC for a vehicle fitted with 1) a standard oxidation catalyst, 2) a three PGM zone oxidation catalyst according to the invention, 3) a two zone washcoated oxidation catalyst (for the purposes of comparison only) and 4) a combined three PGM zone and two zone washcoated oxidation catalyst according to the invention.

FIG. 3 shows the results for a series of NEDC tests done on a 1.3 litre capacity TDI passenger vehicle (also complying with Euro III emission standard. In the bar chart, 1) is a standard oxidation catalyst; 2) is a three PGM zone oxidation catalyst according to the invention; 3) is a two zone washcoated oxidation catalyst according to the invention; and 4) is a combined three PGM zone and two zone washcoated oxidation catalyst according to the invention. The Pt loading for each of 1)-4) was 70 gft$^{-3}$.

It can be seen from FIG. 3 that both the three Pt zone oxidation catalyst and two washcoat zone oxidation catalyst provide an improvement over the standard, homogenous oxidation catalyst and using less total Pt. It can also be seen that the combined three PGM zone and two zone washcoated oxidation catalyst according to the invention provides a further improvement over both the three Pt zone oxidation catalyst and two washcoat zone oxidation catalyst concepts. The conversion for HC, CO and NO$_x$ for the combined three PGM zone and two zone washcoated oxidation catalyst according to the invention compared with the standard oxidation catalyst is shown in Table 1.

TABLE 1

Average Tailpipe Bag Emissions for NEDC tests on Vehicle B

| | HC (g/km) | CO (g/km) | NO$_x$ (g/km) |
|---|---|---|---|
| Standard Oxidation Catalyst | 0.051 | 0.529 | 0.215 |
| Combined concept oxidation catalyst | 0.035 | 0.293 | 0.230 |

The invention claimed is:

1. An exhaust system for a lean-burn internal combustion engine, comprising a catalyst for oxidising carbon monoxide (CO) and hydrocarbons (HC), which catalyst comprising a flow-through substrate monolith comprising:

a first platinum group metal zone of substantially uniform length containing at least one platinum group metal (PGM) supported on a surface area-increasing washcoat component, which first platinum group metal zone being defined at an upstream end by an inlet end of the substrate monolith and at a downstream end by a point less than half way along a length of the substrate monolith measured from the inlet end;

a second platinum group metal zone containing at least one PGM supported on a surface area-increasing washcoat component, which second platinum group metal zone being of substantially uniform length and comprising the point half way along the substrate monolith length measured from the inlet end; and a third platinum group metal zone containing at least one PGM supported on a surface area-increasing washcoat component of substantially uniform length, which third platinum group metal zone being defined at a downstream end by an outlet end of the substrate monolith and at an upstream end by a point at most three quarters of the way along the substrate monolith length measured from the inlet end, wherein both the PGM loading in the first platinum group metal zone and the PGM loading in the third platinum group metal zone is greater than the PGM loading in the second platinum group metal zone, and wherein the first platinum group metal zone comprises a washcoat loading that is less than a washcoat loading of the third platinum group metal zone.

2. An exhaust system according to claim 1, wherein the substrate monolith comprises a first washcoat zone and a second washcoat zone comprising the surface area-increasing washcoat components of the first, second, and third platinum group metal zones, wherein the downstream end of the first washcoat zone is 15-70% along the substrate monolith length measured from the inlet end, and the second washcoat zone is 10-80% of the total monolith length.

3. An exhaust system according to claim 1, wherein the substrate monolith comprises a first washcoat zone and a second washcoat zone comprising the surface area-increasing washcoat components of the first, second, and third platinum group metal zones, wherein the upstream end of the first washcoat zone is 70-15% along the substrate monolith length measured from the inlet end, and the second washcoat zone is 10-80% of the total monolith length.

4. An exhaust system according to claim 1, wherein at least one PGM is selected from the group consisting of platinum, palladium, rhodium, iridium and any two or more thereof.

5. An exhaust system according to claim 1, wherein the PGM in the first, second and third platinum group metal zones consists of platinum.

6. An exhaust system according to claim 1, wherein the total PGM loading in first platinum group metal zone is from 10 gft$^{-3}$ to 240 gft$^{-3}$.

7. An exhaust system according to claim 1, wherein the total PGM loading in third platinum group metal zone is from 10 gft$^{-3}$ to 120 gft$^{-3}$.

8. An exhaust system according to claim 7, wherein the PGM loading in the first platinum group metal zone is the same as the PGM loading in the third platinum group metal zone.

9. An exhaust system according to claim 1, wherein the total PGM loading in the second platinum group metal zone is from 5 gft$^{-3}$ to 30 gft$^{-3}$.

10. An exhaust system according to claim 1, wherein the total PGM loading on the substrate monolith as a whole is from 25 gft$^{-3}$ to 390 gft$^{-3}$.

11. An exhaust system according to claim 1, wherein the washcoat component comprises an oxide selected from the group consisting of zeolites, alumina, titania, silica, ceria, zirconia and mixtures and mixed and composite oxides containing any two or more thereof.

12. An exhaust system according to claim 1, wherein the substrate monolith comprises a first, a second, and a third washcoat zone equivalent in length to the first, second, and third platinum group metal zones, and a washcoat loading of the second washcoat zone is the same as a washcoat loading in the third washcoat zone.

13. An exhaust system according to claim 1, wherein the substrate monolith comprises a first washcoat zone equivalent in length to the first platinum group metal zone, and a washcoat loading in the first washcoat zone is from 0.5 gin$^{-3}$ to 2.5 gin$^{-3}$.

14. An exhaust system according to claim 1, wherein the substrate monolith comprises a third washcoat zone equivalent in length to the third platinum group metal zone, and a washcoat loading in the third washcoat zone is from 1.5 gin$^{-3}$ to 5.0 gin$^{-3}$.

15. An exhaust system according to claim 1, wherein the substrate monolith comprises a first, a second, and a third washcoat zone equivalent in length to the first, second, and third platinum group metal zones, and a thermal capacity of a washcoat component in the third washcoat zone is inherently greater than a thermal capacity of a washcoat component in the first washcoat zone.

16. An exhaust system according to claim 15, wherein the substrate monolith comprises a first, a second, and a third washcoat zone equivalent in length to the first, second, and third platinum group metal zones, and the washcoat loading in the first washcoat zone is substantially the same as the washcoat loading in the third washcoat zone.

17. An exhaust system according to claim 16, wherein the substrate monolith comprises a third washcoat zone equivalent in length to the third platinum group metal zone, and a washcoat component in the third washcoat zone has a density of at least 3.5 gcm$^{-3}$.

18. An exhaust system according to claim 16, wherein the washcoat component in the third washcoat zone is selected from the group consisting of densified alpha alumina, densified zirconia, densified lanthana, densified ceria and mixtures of any two or more thereof.

19. An exhaust system according to claim 1 further comprising a diesel engine.

20. An exhaust system according to claim 1, wherein the surface area-increasing washcoat component of the first platinum group metal zone is a first surface area-increasing washcoat component in a first washcoat zone, the surface area-increasing washcoat component of the second platinum group metal zone is a second surface area-increasing washcoat component in a second washcoat zone, and the surface area-increasing washcoat component of the third platinum group metal zone is a third surface area-increasing washcoat component in a third washcoat zone.

* * * * *